US012065871B2

(12) United States Patent
Lee

(10) Patent No.: US 12,065,871 B2
(45) Date of Patent: Aug. 20, 2024

(54) INSTALLATION STRUCTURE OF GLASS FIXING GASKET AND WINDOW GLASS PANEL FIXING BRACKET OF FIXED WINDOW IN SLIDING WINDOW SYSTEM COMPRISING SEGMENTED WINDOW FRAME

(71) Applicant: FILOBE CO., LTD., Gyeongsangbuk-do (KR)

(72) Inventor: Kwang-Seog Lee, Daegu (KR)

(73) Assignee: FILOBE CO., LTD., Gyeongsan-si (KR)

( * ) Notice: Subject to any disclaimer, the term of this patent is extended or adjusted under 35 U.S.C. 154(b) by 419 days.

(21) Appl. No.: 17/057,779

(22) PCT Filed: May 24, 2019

(86) PCT No.: PCT/KR2019/006290

§ 371 (c)(1),
(2) Date: Nov. 23, 2020

(87) PCT Pub. No.: WO2019/226023

PCT Pub. Date: Nov. 28, 2019

(65) Prior Publication Data

US 2021/0207425 A1 Jul. 8, 2021

(30) Foreign Application Priority Data

May 24, 2018 (KR) ........................ 10-2018-0058870

(51) Int. Cl.
*E06B 3/46* (2006.01)
*E06B 3/26* (2006.01)
(Continued)

(52) U.S. Cl.
CPC .......... *E06B 3/4618* (2013.01); *E06B 3/2605* (2013.01); *E06B 3/26347* (2013.01);
(Continued)

(58) Field of Classification Search
CPC .. E06B 3/4618; E06B 3/2605; E06B 3/26347; E06B 1/04; E06B 3/46;
(Continued)

(56) References Cited

U.S. PATENT DOCUMENTS

| | | | | |
|---|---|---|---|---|
| 4,599,836 A * | 7/1986 | Melcher | E06B 5/003 52/202 |
| 9,103,159 B2 * | 8/2015 | Kim | E06B 7/231 |

(Continued)

FOREIGN PATENT DOCUMENTS

| | | |
|---|---|---|
| JP | 07-026846 A | 1/1995 |
| KR | 10-1540049 B1 | 7/2015 |

(Continued)

OTHER PUBLICATIONS

PCT/ISA/237 for application PCT/KR2019/006290.
PCT/ISA/210 for application PCT/KR2019/006290.

*Primary Examiner* — Justin B Rephann
(74) *Attorney, Agent, or Firm* — Reichel Stohry Dean LLP; Mark C. Reichel; Natalie J. Dean

(57) ABSTRACT

The present invention relates to an installation structure of a glass fixing gasket and a window glass panel fixing bracket, which fixes a window glass panel of a fixed window included in a sliding window system which comprises a segmented window frame and, more specifically, to an installation structure of a glass fixing gasket and a window glass panel fixing bracket, wherein the glass fixing gasket and the window glass panel fixing bracket are installed between a window frame portion which supports three sides (an upper surface, a lower surface, and one external side surface that is not a middle bar side surface) of a fixed window included in a sliding window and a window glass panel provided as a double-pane, in order to provide a sealing function for preventing ventilation and a function of stably fixing the window glass panel against high wind
(Continued)

pressure (wind pressure resistance), and moreover, to ensure maximum heat insulation performance.

4 Claims, 13 Drawing Sheets

(51) Int. Cl.
*E06B 3/263* (2006.01)
*E06B 3/267* (2006.01)

(52) U.S. Cl.
CPC . *E05Y 2900/148* (2013.01); *E06B 2003/2625* (2013.01); *E06B 3/267* (2013.01)

(58) Field of Classification Search
CPC ........ E06B 3/4609; E06B 3/4636; E06B 7/22; E05D 15/0665; E05D 15/0686; E05D 15/0621
See application file for complete search history.

(56) References Cited

U.S. PATENT DOCUMENTS

| | | | | |
|---|---|---|---|---|
| 9,453,360 | B2 * | 9/2016 | Kim | E05D 15/0665 |
| 9,512,656 | B2 * | 12/2016 | Lee | E05D 15/0682 |
| 2010/0242365 | A1 * | 9/2010 | Langner | E05D 15/0686 49/404 |
| 2012/0005975 | A1 * | 1/2012 | Kim | E06B 7/14 52/656.5 |
| 2015/0052819 | A1 * | 2/2015 | Lee | E05D 15/0621 49/420 |
| 2018/0038144 | A1 * | 2/2018 | Metzger | E06B 3/469 |

FOREIGN PATENT DOCUMENTS

| | | | |
|---|---|---|---|
| KR | 1015400490000 | | 7/2015 |
| KR | 10-2016-0069005 | A | 6/2016 |
| KR | 10-2017-0130162 | A | 11/2017 |
| KR | 10-2018-0046781 | A | 5/2018 |
| KR | 1020180046781 | | 5/2018 |
| KR | 1020160069005 | | 3/2019 |
| KR | 1020170130162 | | 12/2020 |

* cited by examiner

[Prior Art] When EPDM material gasket is applied

[Comparative Example 1] When an Expanded Rubber material gasket is applied

[B-B' Section]

[Invention] When an Expanded Rubber material gasket is applied

[Comparative Example 2] When EPDM material gasket is applied

INSTALLATION STRUCTURE OF GLASS FIXING GASKET AND WINDOW GLASS PANEL FIXING BRACKET OF FIXED WINDOW IN SLIDING WINDOW SYSTEM COMPRISING SEGMENTED WINDOW FRAME

TECHNICAL FIELD

The present invention relates to an installation structure of a glass fixing gasket and a window glass panel fixing bracket for fixing a window glass panel of a fixed window constituting a sliding window system comprising a segmented window frame to the window frame. More specifically, it relates to the installation structure of a glass fixing gasket and a window glass panel fixing bracket that not only provides a stable fixing function (wind pressure resistance) of the panel, but also ensures maximum insulation performance. The structure is installed between the window frame portion that supports the three sides (an upper side, a lower side, and an outer one side (but not a middle bar side)) of the fixed window constituting the sliding window and a windowpane panel provided as a pair glass to prevent ventilation.

BACKGROUND ART (PRIOR ART)

In general, a fixed window constituting a sliding window system is formed by fixing a window glass panel 100 in a window frame made of aluminum (Al). As shown in FIG. 1*a*, a window frame supporting a lower side of the fixed window is divided into outer frames 111 and 113 and an inner frame 121, and is formed by connecting with an insulating connector 131 formed of an insulating material therebetween. A segment-type glass support 132 made of a foamed plastic material is inserted and installed on a top of the insulating connector 131. An outer gasket installation bracket 112 extended from the outer frames 111 and 113 and an inner gasket installation bracket 122 extended from the inner frame 121 are additionally installed, and an outer glass fixing gasket 112*g* made of EPDM synthetic rubber is fitted with the outer gasket mounting bracket 112 and an inner glass fixing gasket 122*g* made of EPDM synthetic rubber is fitted with the inner gasket mounting bracket 122, in order to support by contacting and supporting an outer surface and an inner surface of the windowpane panel 100 (pair glass) seated on the top of the segment-type glass support 132 made of a foamed plastic material. The frames 210, 220, and 230 shown in FIG. 1*a* provide a moving path for the sliding window installed inside and support it, and the insulation connector 310 is provided for thermal insulation and structural connection between a window frame for supporting an outer fixed window and a window frame for supporting an inner sliding window.

In this fixed window installation structure, the outer glass fixing gasket 112*g* and the inner glass fixing gasket 122*g*, which are made of EPDM synthetic rubber, sufficiently provide two functions: air tightness to block ventilation and structural fixing (holding) force strength (wind pressure resistance) of the windowpane panel. However, since the heat loss generated by the EPDM synthetic rubber is large, there is a problem in that the window system has a limitation for improvement of thermal insulation performance and energy efficiency.

To confirm this, a numerical analysis model (outdoor temperature −18° C., room temperature 21° C.: temperature difference $\Delta T=39°$ C.) was configured to simulate the temperature of the window system component for this conventional fixed window using EPDM synthetic rubber. According to these numerical analysis test results, as shown in the attached drawing FIG. 1*b*, the temperature drops to 10.9° C. from a reference point on the inner side of the window frame, indicating low energy efficiency (high thermal conductivity characteristics: heat transmission rate U-factor 0.4350 $W/m^2K$). Furthermore, a problem in which dew condensation occurs is confirmed.

Meanwhile, the inventor of the present application conceived on Comparative Example 1 as one primary solution to this problem. In Comparative Example 1, as shown in FIG. 2*a*, the outer glass fixing gasket 112*g* and the inner glass fixing gasket 122*g* were replaced with an outer glass fixing gasket 112*ge* and an inner glass fixing gasket 122*ge* made of expanded rubber material. According to the results of numerical analysis of temperature simulation under the same conditions as in the case of the prior art described above, as shown in FIG. 2B, High energy efficiency (low heat conduction characteristic: heat transmission rate U-factor 0.3177 $W/m^2K$) was exhibited while maintaining a high temperature of 15.3° C. at the reference point inside the window frame. Furthermore, it was confirmed that the effect of preventing condensation was expected.

However, in the case of using the same installation structure as the conventional installation structure as in Comparative Example 1 and using the outer glass fixing gasket 112*ge* and the inner glass fixing gasket 122*ge* made of foam rubber material only through material change, heat loss can be prevented. And it can provide air tightness to block ventilation. However, due to the large elastic deformation characteristic of the foam rubber material, as shown in FIG. 3, when the wind of strong wind pressure blows, the inside of the windowpane panel is excessively pushed. Thereby, a problem arises in that the structurally stable fixing force (wind pressure resistance) of the panel cannot be sufficiently provided.

DETAILED DESCRIPTION OF THE INVENTION

Technical Problem

The present invention has been made in order to solve the problems in the prior art and a technical object of the present invention is to provide a means for providing new installation structure of a glass fixing gasket and a window glass panel fixing bracket for fixing a window glass panel of a fixed window constituting a sliding window system including a segment type window frame to a window frame, not only for providing a sealing function that prevents ventilation between the window frame portion and the windowpane panel provided as a pair of glass, and a stable fixing function (wind pressure resistance) of the windowpane panel against high wind pressure, but also for maximizing the insulation performance.

Technical Solution

In order to solve the above-described problems, the present invention provides an installation structure of a glass fixing gasket for a fixed window and a window glass panel fixing bracket constituting a sliding window system including a segment type window frame;

as being installed between the window frame portion that supports the three sides (an upper side, a lower side, and an outer one side (but not a middle bar side)) of the fixed window and a window glass panel provided as pair glass, the installation structure comprising;

an outer segment insulation support inserted into the window frame of an outer portion and a central portion of the window glass, and an inner segment insulation support inserted into the window frame of an inner portion of the window glass;

an insulating glass pedestal made of an expanded plastic-based material that is inserted and installed in a space between the outer segment insulating support and the inner segment insulating support;

an outer glass fixing gasket made of an expanded rubber material which is fitted to a first fitting groove formed on an outer portion of the insulating glass pedestal;

a window glass panel fixing bracket made of an expanded plastic-based material having a fitting protrusion which is fitted to a second fitting groove formed on an inner portion of the insulating glass pedestal, wherein the window glass panel fixing bracket is installed in a wedge method to respond to the static pressure of the wind pressure by supporting the inner side of the window glass panel; and an inner glass fixing gasket made of an expanded rubber material coupled to a fitting groove formed in the window glass panel fixing bracket; and the installation structure having an additional characteristic in that, an inner shape of the insulating glass pedestal has a reduced cross-section so as not to interfere with the central support surface of the inner segment insulation support, when a rotational fitting end of the inner segment insulating support to be subsequently coupled is rotated by a set angle and fitted to an inner locking protrusion of the window frame of the outer portion and the central portion of the window glass.

Herein, the insulating glass pedestal is not installed to support the window glass panel only at a portion of the corner, but is a member being installed to continuously contact the window glass panel on the upper surface, the lower surface, and one side of the window glass panel. Therefore, multiple segmented pedestals can be installed in series at one side.

In addition, it is more preferable that a glass height adjustment support is interposed between the insulating glass pedestal and the window glass panel.

Advantageous Effects

According to the present invention, by virtue of the window glass panel fixing bracket, which is made of an expanded plastic-based material having a fitting protrusion coupled to a second fitting groove formed on the inner side of the insulating glass pedestal, and is installed in a wedge method to respond to the static pressure of the wind pressure by supporting the inner side of the window glass panel, structurally stable fixing function (wind pressure resistance) of the window glass panel can be achieved, and a sealing function for preventing ventilation and an insulation function for preventing heat loss can be provided by the outer glass fixing gasket made of expanded rubber material that is coupled to the first fitting groove formed on the outside of the insulating glass base, and by the inner glass fixing gasket made of expanded rubber material that is coupled to the fitting groove formed in the bracket. Therefore, as a result, it provides the effect of structurally separating a member that provides sealing and insulation functions as the main function and a member that provides a structurally stable fixing function (wind pressure resistance) of the window pane as the main function.

MODE FOR CARRYING OUT THE INVENTION

Hereinafter, embodiments of the present invention will be described with reference to the accompanying drawings such that a person ordinarily skilled in the art to which the present invention belongs, may easily embody the present invention. However, the present invention may be implemented in various forms and is not limited to the embodiments described herein.

According to a preferred embodiment of the present invention as shown in FIGS. 4 and 5*a* to 6*f*, installation structure of a glass fixing gasket and a window glass panel fixing bracket is provided in order to fix the window pane panel of the fixed window constituting the sliding window system including the segment type window frame to the window frame. And more specifically, the newly improved installation structure of a glass fixing gasket and a window glass panel fixing bracket is provided between a window frame portion 1110, 1310, 1500, 1120, 1220 that supports the three sides (the upper side, the lower side, the outer one side of the middle bar rather than the side of the middle bar) of the fixed window constituting the sliding window; and a window glass panel 100 provided as pair glass, to provide a sealing function to prevent ventilation and a stable fixing function (wind pressure resistance) of the window glass panel 100 against high wind pressure. In addition, in order to ensure maximum insulation performance, the newly improved insulation structure of the glass fixing gasket and the window glass panel fixing bracket is provided.

According to the present invention, the newly improved installation structure comprises, an insulating glass pedestal 1330 made of expanded plastic-based material having a specific shape;

a window glass panel fixing bracket 1330*k* made of expanded plastic-based material;

an outer glass fixing gasket and an inner glass fixing gasket made of a foam rubber material being changed and replaced with the existing EPDM material.

Figure 1A:
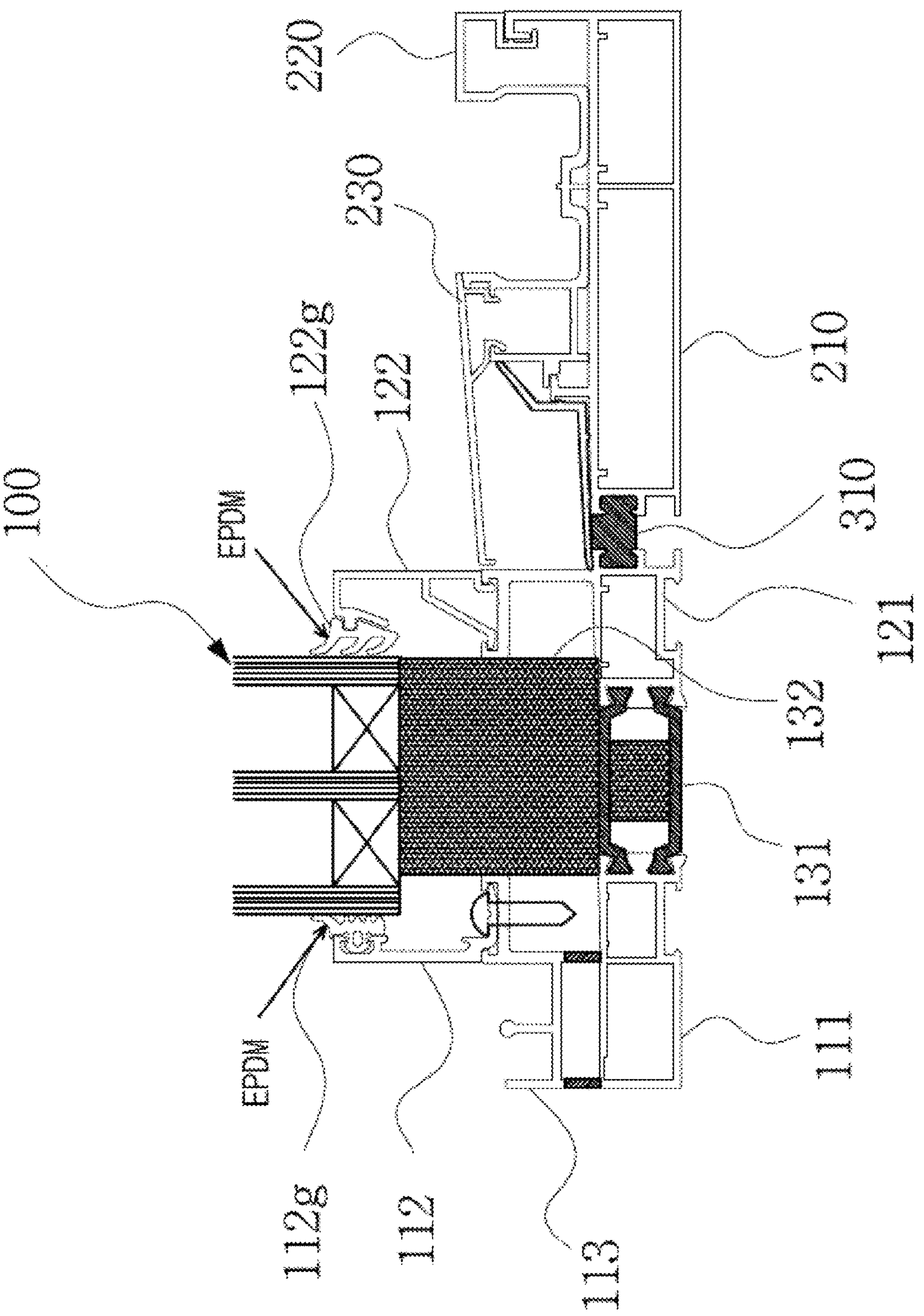
FIG. 1*a* shows a fixed window that generally constitutes a sliding window system, wherein Here, when the windowpane panel is fixedly installed in the window frame made of aluminum, an outer gasket installation bracket 112 and an inner gasket installation bracket 122 are equipped with the EPDM synthetic rubber inner glass fixing gasket to support the outer and inner surfaces of the windowpane.
Figure 1B:
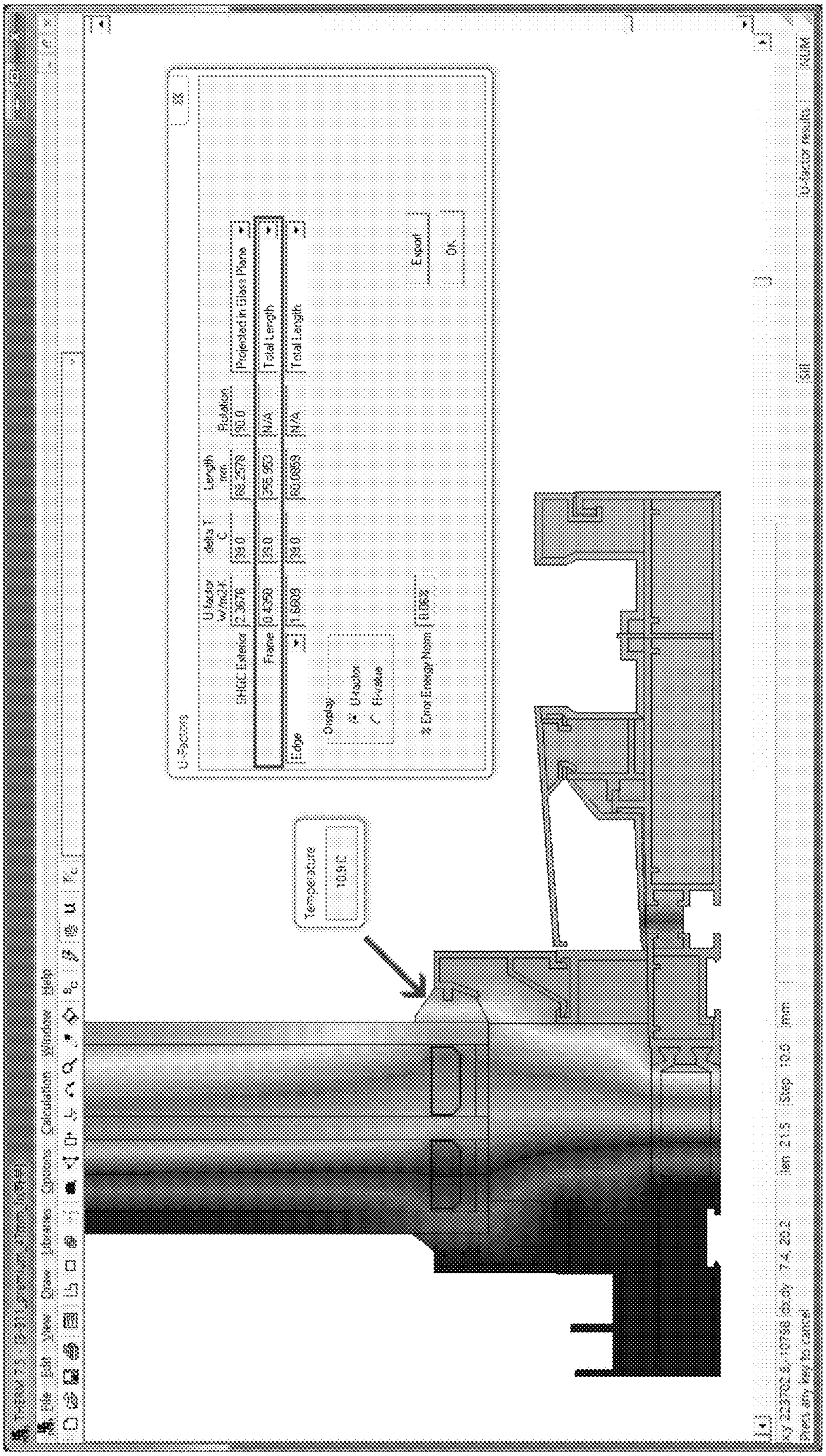
FIG. 1*b* is a diagram showing the result of a numerical analysis test seen by simulating the temperature of a window system component for the structure illustrated in FIG. 1*a*.
Figure 2A:
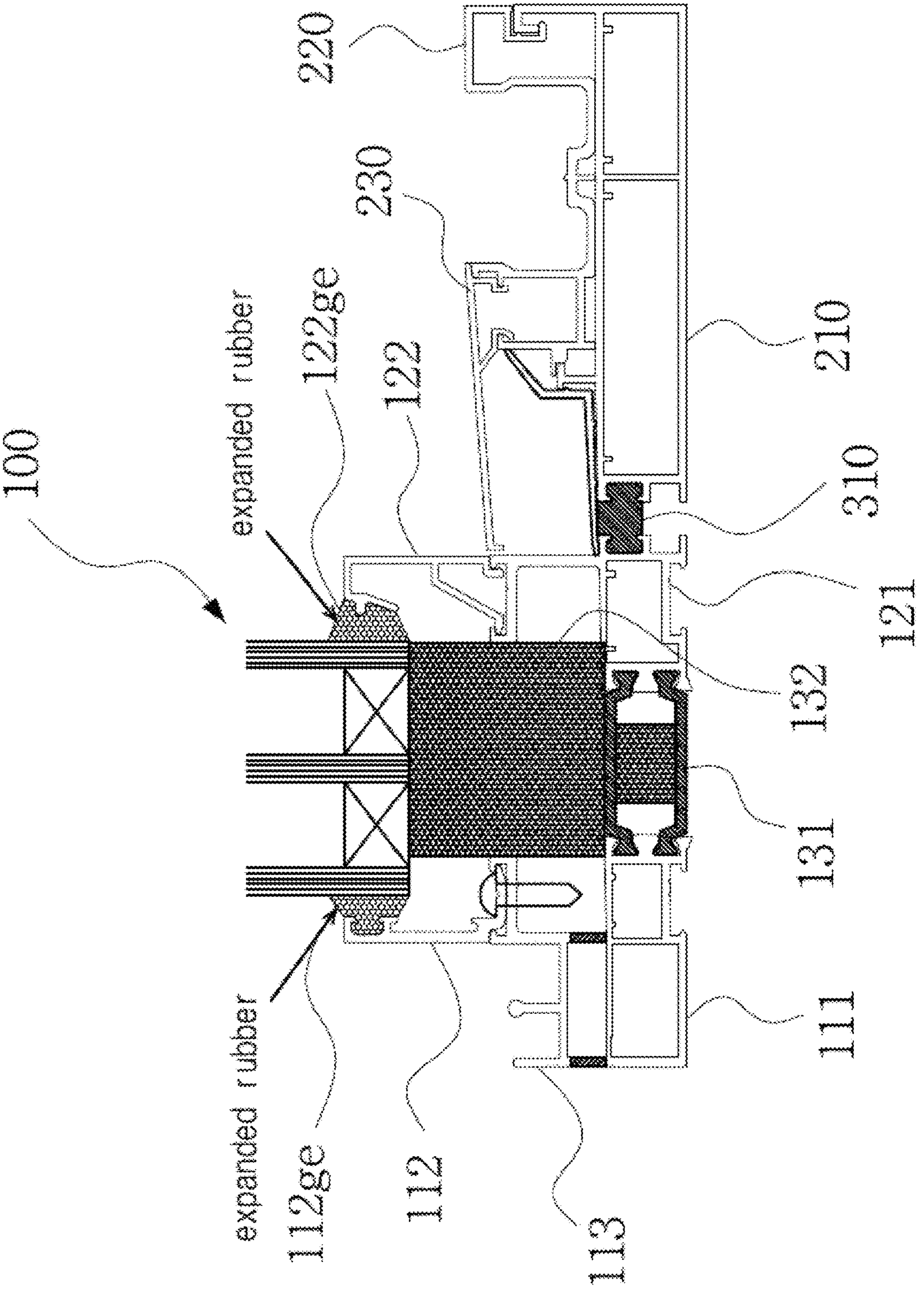
FIG. 2*a* shows a Comparative Example 1 in which the outer glass fixing gasket 112*g* and the inner glass fixing gasket 122*g* of EPDM synthetic rubber material in FIG. 1*a* were replaced with an outer glass fixing gasket 112*ge* and an inner glass fixing gasket 122*ge* made of expanded rubber material.
Figure 2B:
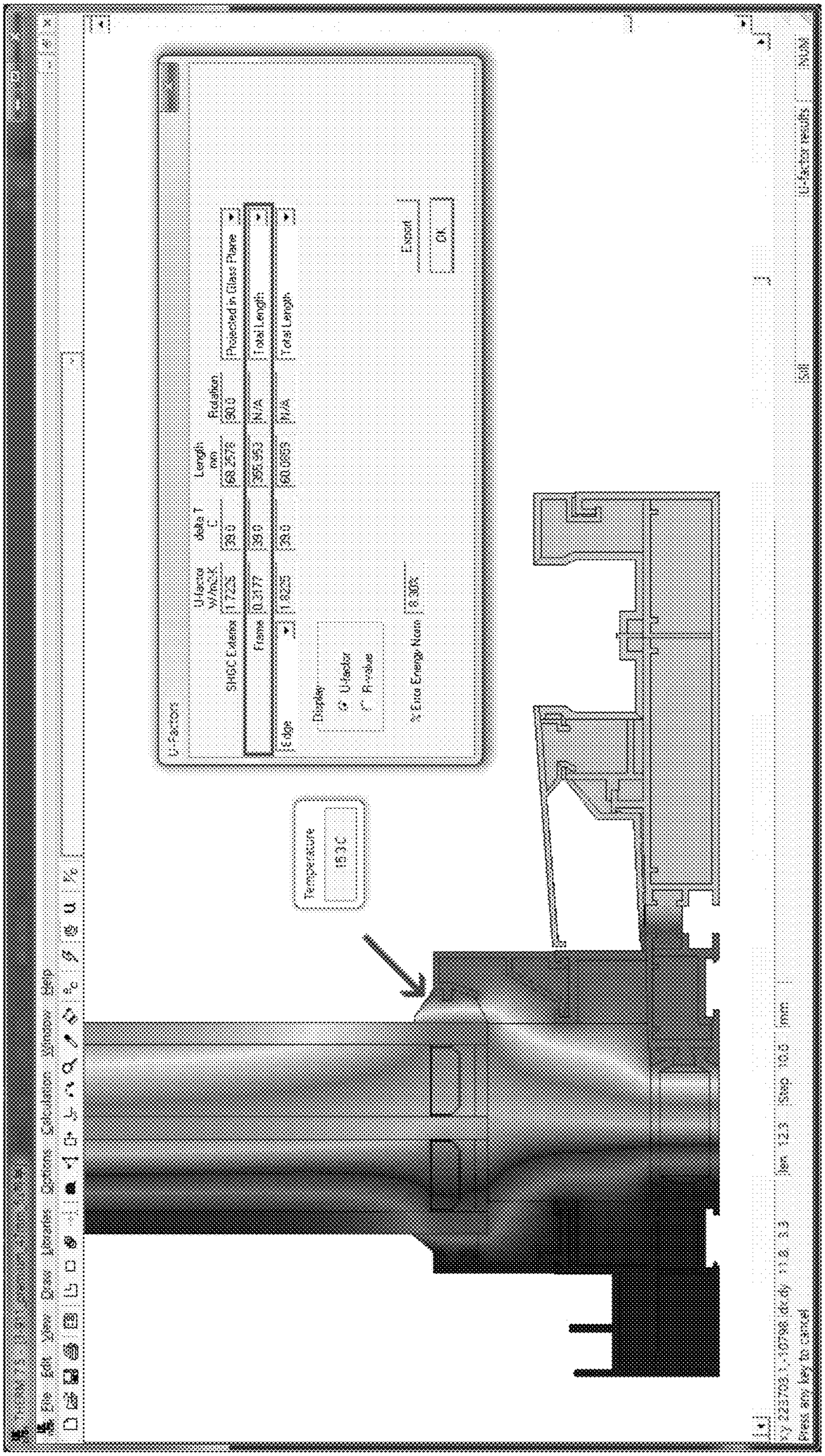
FIG. 2*b* is a numerical analysis test result for Comparative Example 1.
Figure 3:
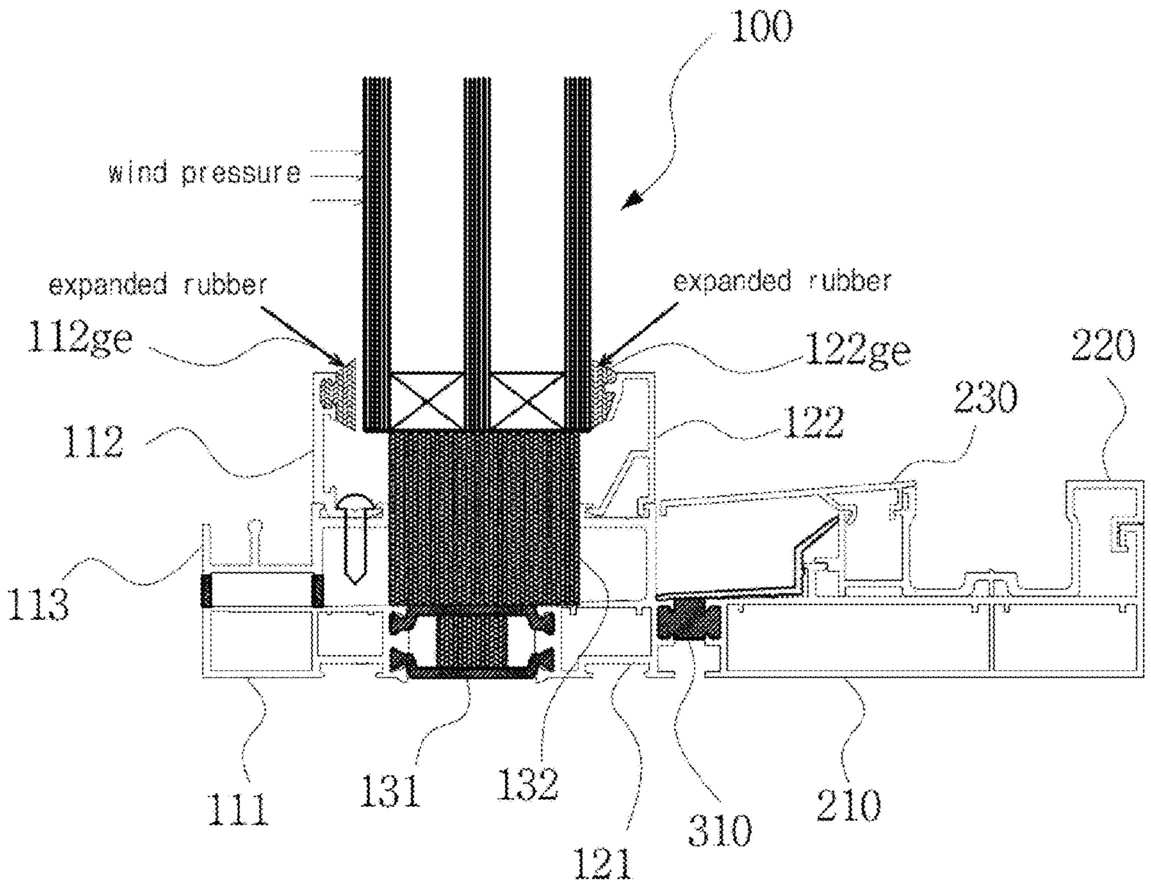
FIG. 3 is a diagram showing the structural problems of Comparative Example 1.
Figure 4:
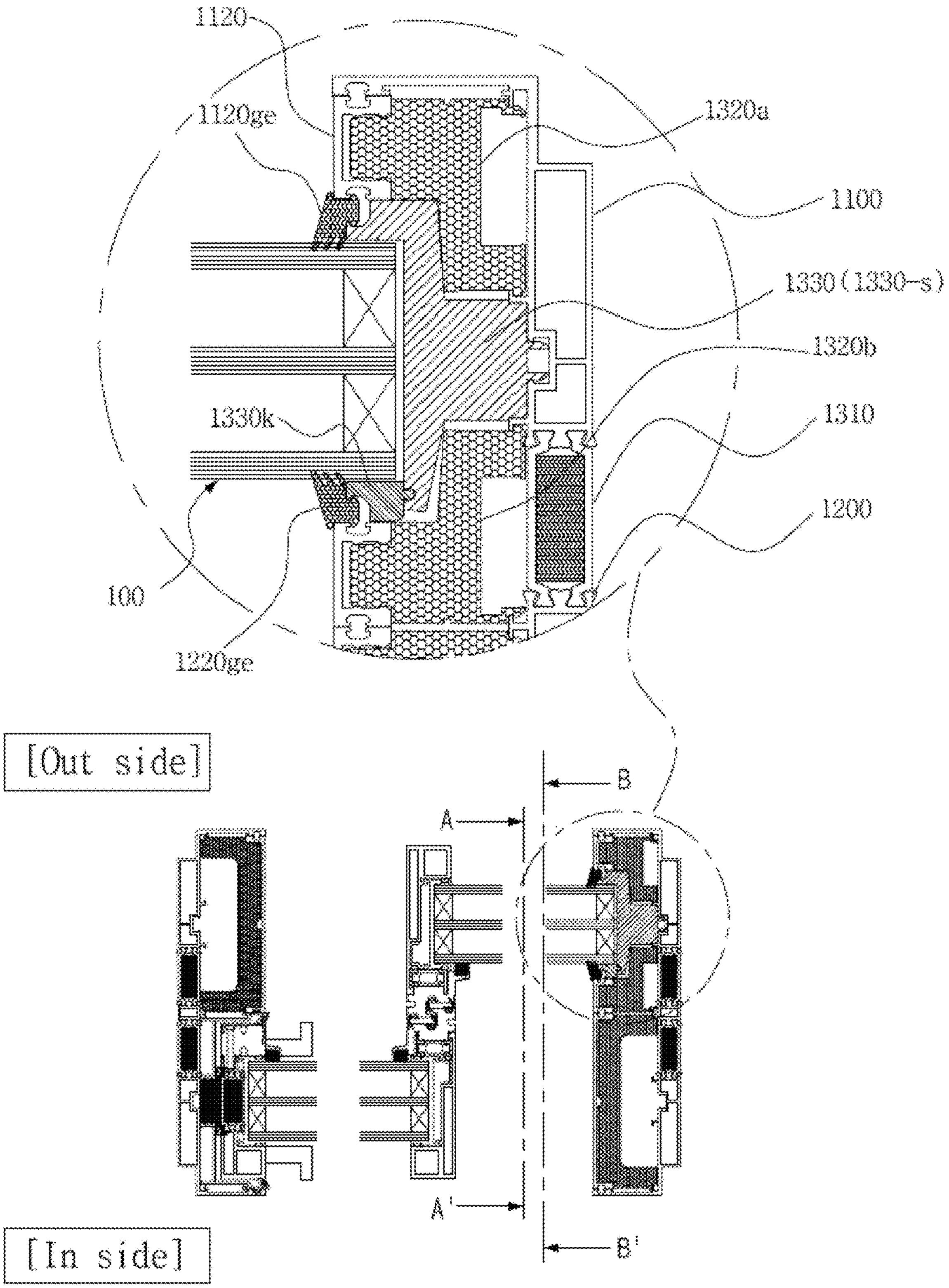
FIG. 4 is a plan view showing an embodiment of an installation structure of a glass fixing gasket and a window glass panel fixing bracket of a fixed window constituting a sliding window system including a segment type window frame according to the present invention.
Figure 5A:
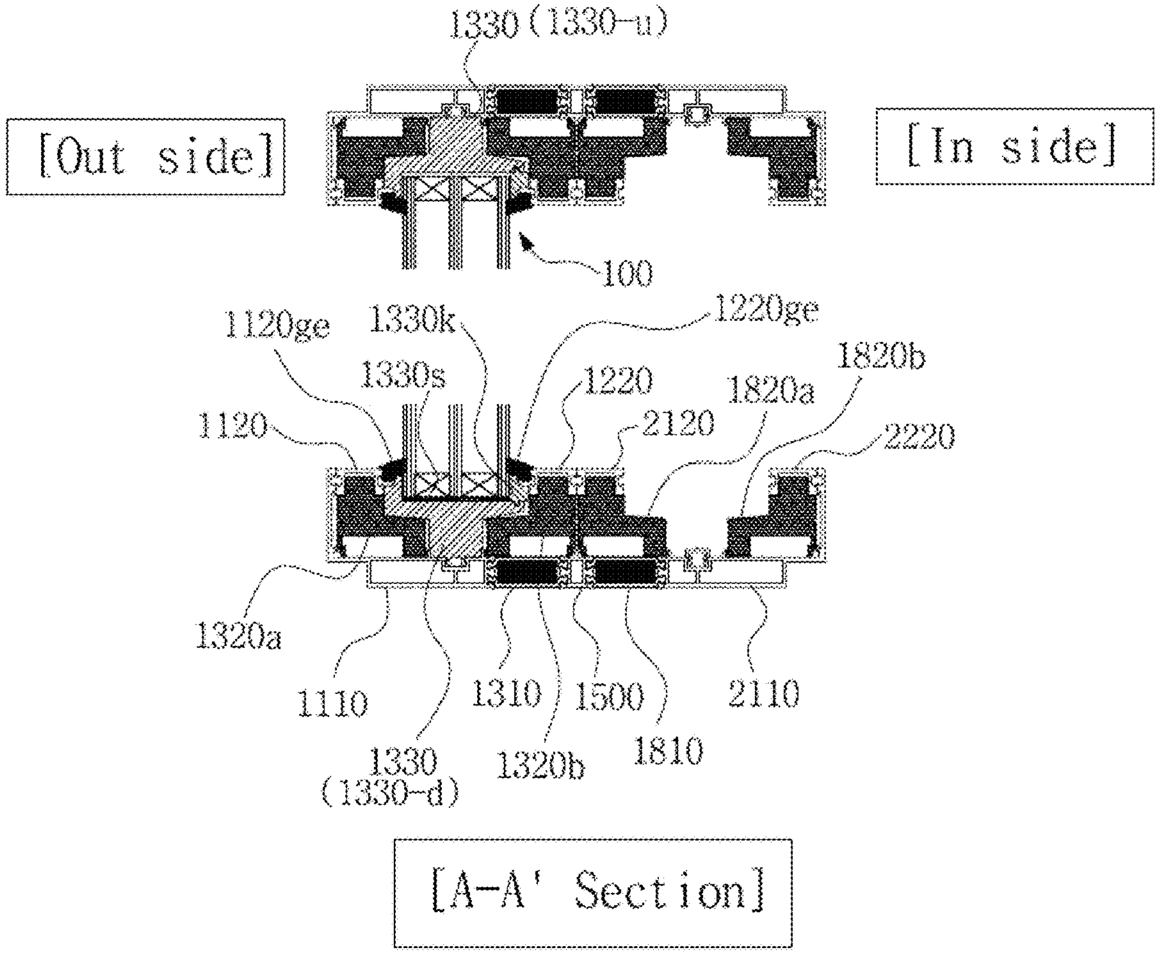
FIG. 5*a* and FIG. 5*b* are sectional views A-A' and B-B' of FIG. 4, respectively.
Figure 5B:
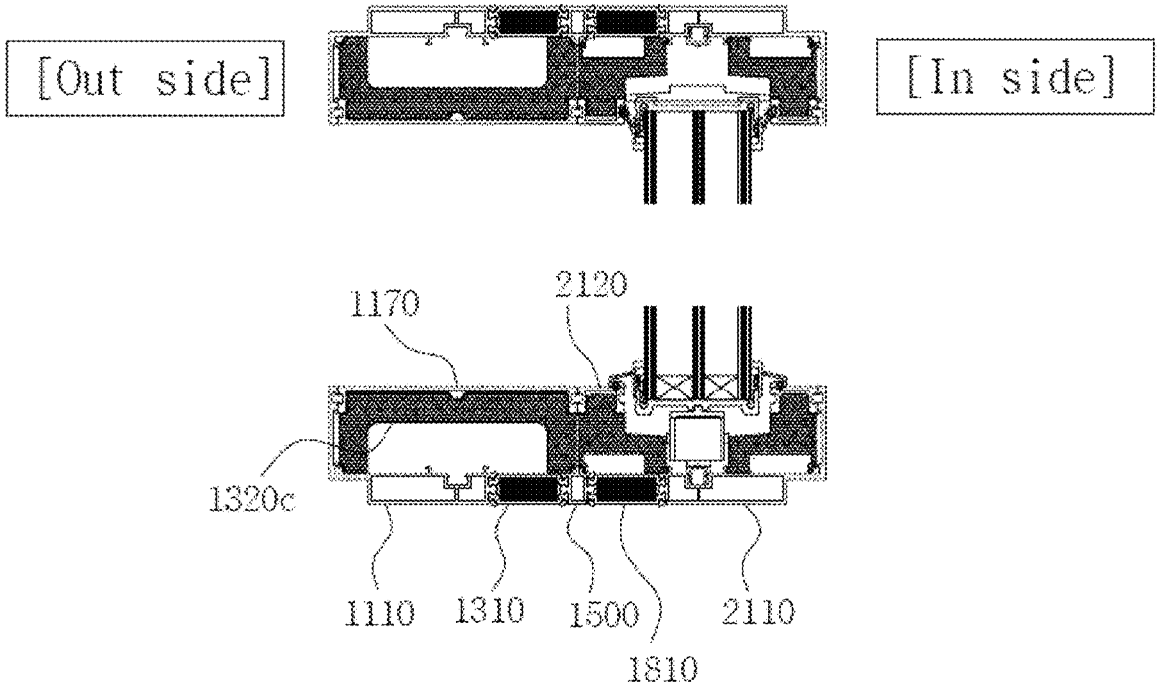

Furthermore, the installation structure of an elastic gasket according to the present invention is as shown in FIG. 4, and FIGS. 5*a* and 5*b*, an installation structure of a glass fixing gasket for a fixed window and a window glass panel fixing bracket constituting a sliding window system including a segment type window frame;

as being installed between the window frame portion 1110, 1310, 1500, 1120, 1220 that supports the three sides (an upper side, a lower side, and an outer one side (but not a middle bar side)) of the fixed window and a window glass panel 100 provided as pair glass, the installation structure comprising;

an outer segment insulation support 1320*a* inserted into the window frame 1110 of an outer portion and a central portion of the window glass, and an inner segment insulation support 1320*b* inserted into the window frame 1310, 1500 of an inner portion of the window glass;

an insulating glass pedestal 1330 (1330-*u*, 1330-*d*, 1330-*s*) made of an expanded plastic-based material that is inserted and installed in a space between the outer segment insulating support 1320*a* and the inner segment insulating support 1320*b;* an outer glass fixing gasket 1120*ge* made of an expanded rubber material which is fitted to a first fitting groove 1330*a* formed on an outer portion of the insulating glass pedestal 1330;

a window glass panel fixing bracket 1330*k* made of an expanded plastic-based material having a fitting protrusion 1330*ka* (referring to FIG. 6*e*) which is fitted to a second fitting groove 1330*b* formed on an inner portion of the insulating glass pedestal 1330, wherein the window glass panel fixing bracket 1330*k* is installed in a wedge method to respond to the static pressure of the wind pressure by supporting the inner side of the window glass panel 100; and an inner glass fixing gasket 1220*ge* made of an expanded rubber material coupled to a fitting groove 1330*kb* formed in the window glass panel fixing bracket 1330*k*; and the installation structure having an additional characteristic in that, an inner shape of the insulating glass pedestal 1330 has a reduced cross-section so as not to interfere with the central support surface 1320*b*-2 of the inner segment insulation support 1320*b*, when a rotational fitting end 1320*b*-1 of the inner segment insulating support 1320*b* to be subsequently coupled is rotated by a set angle and fitted to an inner locking protrusion 1111 of the window frame 1110 of the outer portion and the central portion of the window glass.

Wherein, the outer segment insulating support 1320*a* and the inner segment insulating support 1320*b* may also be provided as a foamed plastic (Expanded Plastic) material.

The insulating glass pedestal 1330 is not installed to support the window glass panel 100 only at a portion of the edge, but is a member to be installed with continuously contacting the window glass panel 100 on the upper surface, the lower surface, and one side of the window glass panel 100. In some cases, a plurality of segmented pedestal may be continuously installed on one side.

In addition, it is more preferable that a glass height adjustment pedestal 1330*s* is interposed between the insulating glass pedestal 1330 and the window glass panel 100.

Components forming such an installation structure complete the installation of the fixed window of the sliding window system by going through the steps shown in FIGS. 6*a* to 6*f*. Hereinafter, FIGS. 6*a* to 6*f*, which sequentially illustrate steps A to F will be described.

Figure 6A:
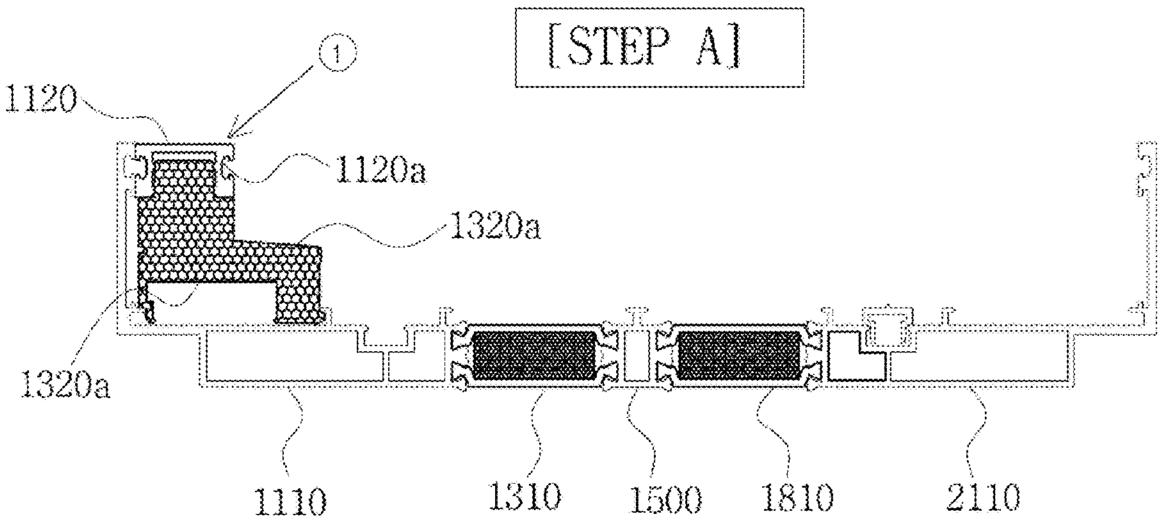
FIGS. 6*a* to 6*f* are diagrams showing step by step a state in which a window glass panel fixing bracket and a glass fixing gasket are installed according to the present invention.
Figure 6B:
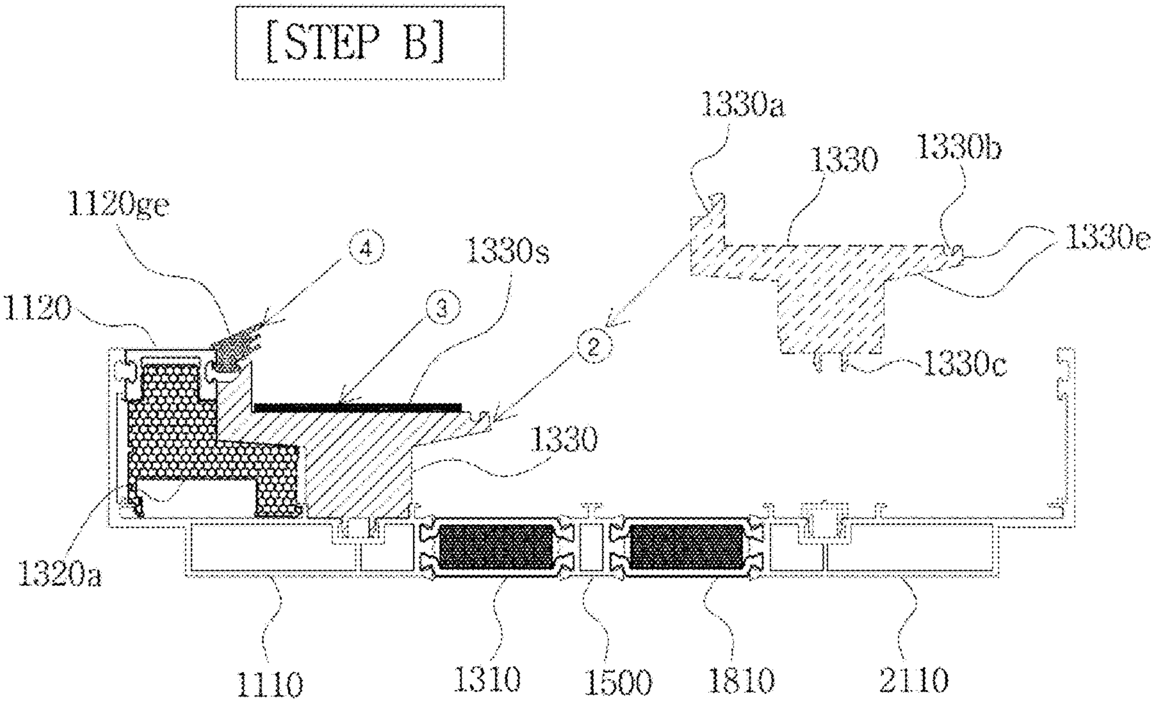

First, as shown in STEP A illustrated in FIG. 6*a*, the outer segment insulation support 1320*a* is inserted and installed inside the window frame 1110 at the outer and central parts of the window glass. And, as shown in STEP B shown in FIG. 6*b*, adjacent to the outer segment insulation support 1320*a* in the center portion of the insulation glass pedestal 1330 (1330-*u*, 1330-*d*, 1330-*s*) made of expanded plastic-based material are fitted and installed using the installation clip 1330*c*. On the upper surface of the insulating glass pedestal 1330, a glass height adjustment pedestal 1330*s* having an appropriately selected height for correcting the height difference is installed before the window glass panel 100 is placed. An outer glass fixing gasket 1120*ge* made of an expanded rubber material is coupled to the first fitting groove 1330*a* formed on the outer side of the insulating glass pedestal 1330. Herein, the foam structure contributes greatly to expanding the thermal insulation properties.

Figure 6C:
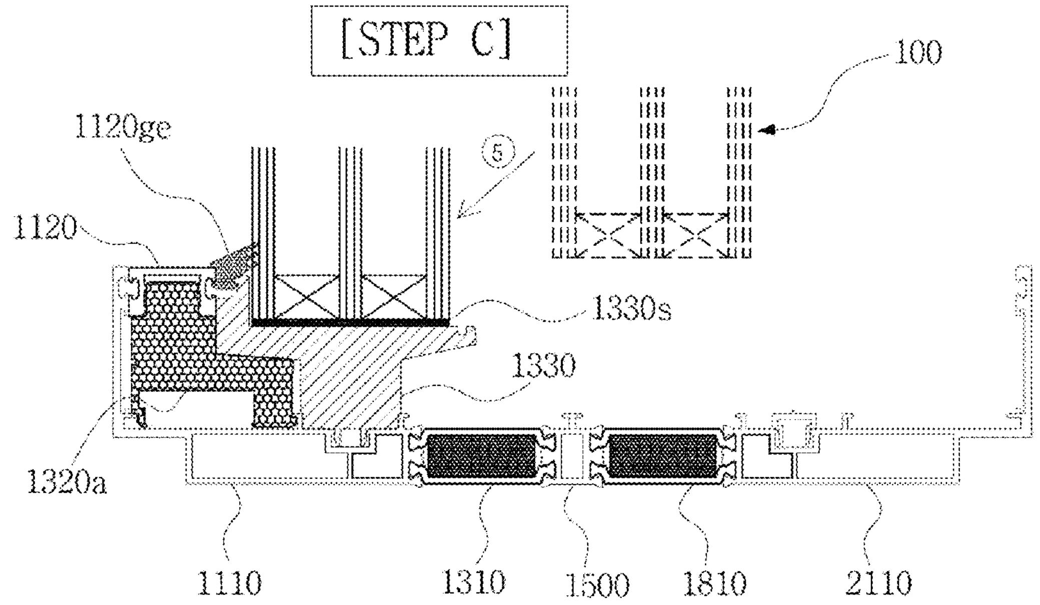
Figure 6D:
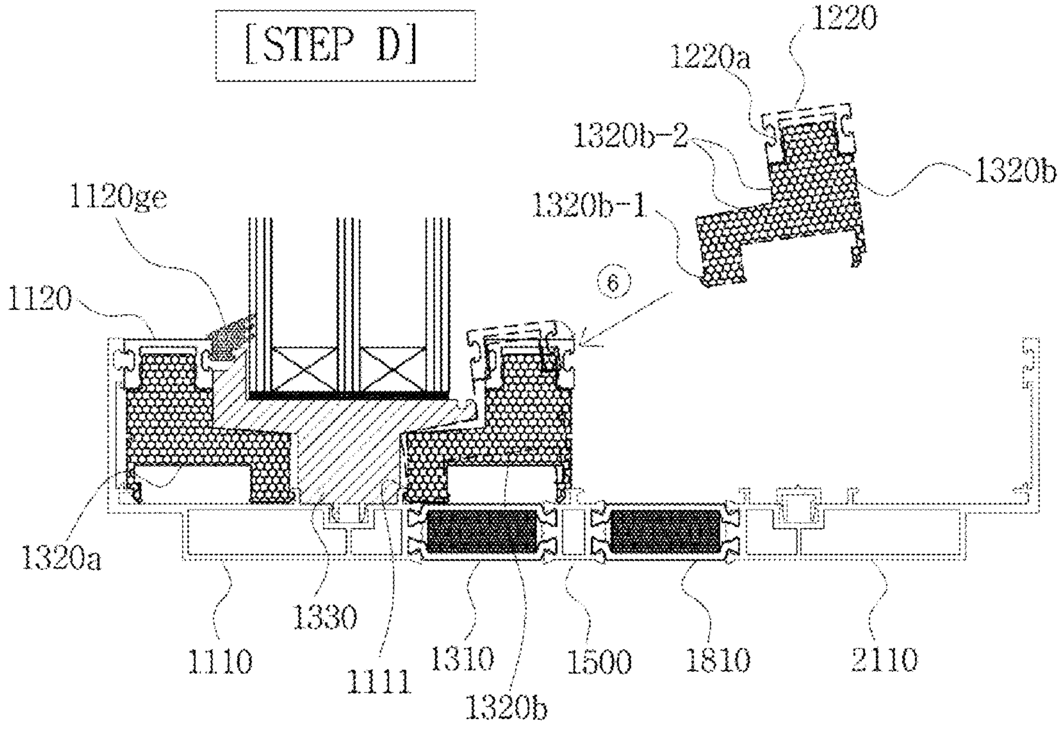
Figure 6E:
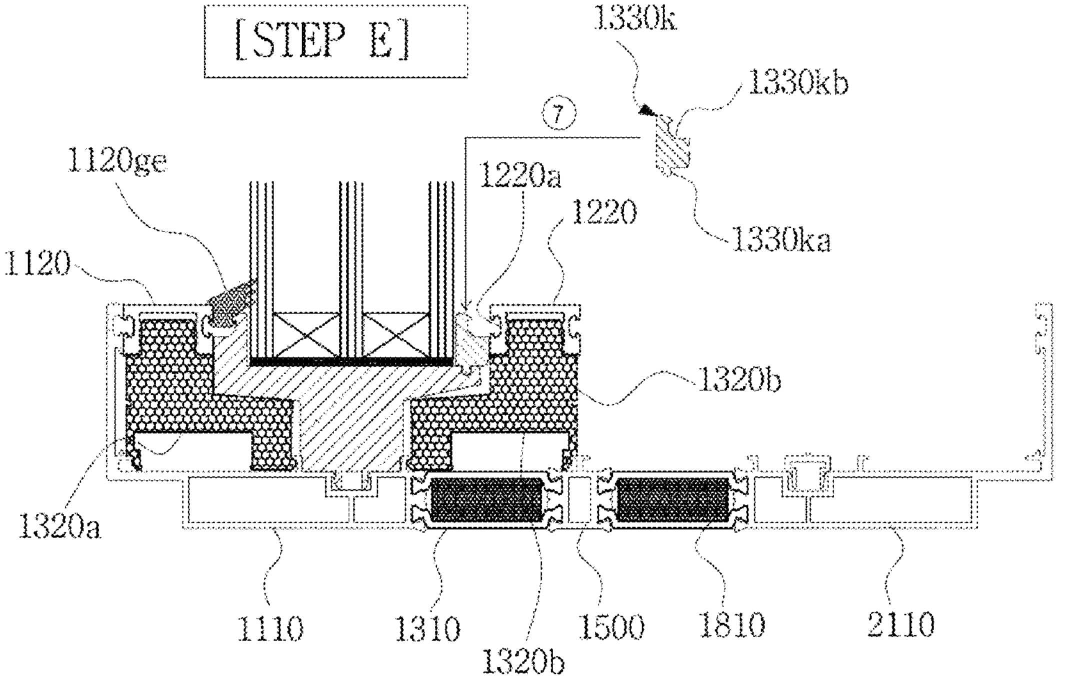
Figure 6F:
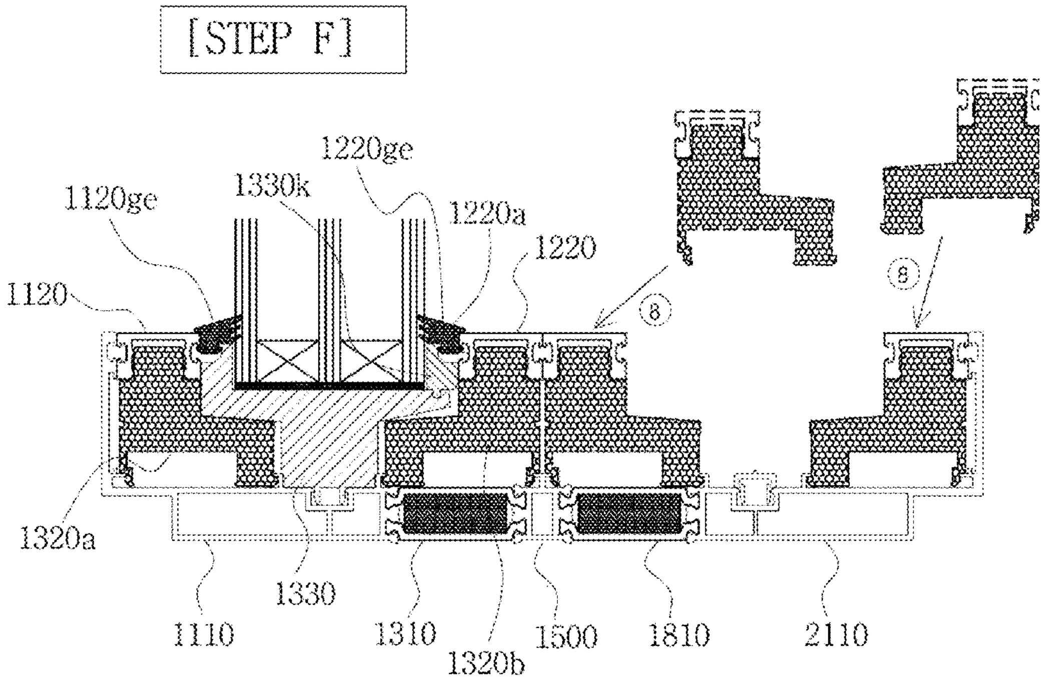

Next, the windowpane panel 100 is placed as shown in STEP C shown in FIG. 6*c*. In addition, as shown in STEP D shown in FIG. 6D, the inner segment insulation support 1320*b* is inserted into the window frames 1310 and 1500 at the inner side of the window glass. At this time, a shape of the inner portion 1330*e* of the insulating glass pedestal 1330 has a reduced cross-section so as not to interfere with the central support surface 1320*b*-2 of the inner segment insulation support 1320*b*, when a rotational fitting end 1320*b*-1 of the inner segment insulating support 1320*b* to be subsequently coupled is rotated by a set angle and fitted to an inner locking protrusion 1111 of the window frame 1110 of the outer portion and the central portion of the window glass. And, as shown in STEP E shown in FIG. 6*e*, a window glass panel fixing bracket 1330*k* made of foamed plastic (Expanded Plastic)-based material, having a fitting protrusion 1330*ka* coupled to the second fitting groove 1330*b* formed on the inner side of the insulating glass pedestal 1330, supports the inner side of the window glass panel and is installed in a wedge manner to respond to the static pressure of the wind pressure.

Then, finally, an inner glass fixing gasket 1220*ge* made of an expanded rubber material is coupled to the fitting groove 1330*ka* formed in the window glass panel fixing bracket 1330*k*. Thus, by completing the fixing of the inner surface of the window glass panel 100 of the fixed window, the assembly work of the main components for installing the fixed window is completed.

Here, the outer glass fixing gasket 1120*ge* and the inner glass fixing gasket 1220*ge* made of expanded rubber material are a first fitting groove 1330*a* formed on the outer side of the insulating glass pedestal 1330 and the window glass panel, respectively. It is coupled to the fitting groove 1330*ka* formed in the fixing bracket 1330*k*. As shown in the drawings, an outer upper cap 1120 made of aluminum is provided on the upper part of the outer segment insulating support 1320*a*, and an outer upper cap 1220 made of aluminum is provided on the upper part of the inner segment insulating support 1320*b*. And for a more stable fixed coupling, the outer glass fixing gasket 1120*ge* and the inner glass fixing gasket 1220*ge* may be fixedly coupled to the coupling grooves 1120*a* and 1220*a* provided on the corresponding surfaces of the outer upper cap 1120 and the outer upper cap 1220, respectively.

In addition, the foamed plastic-based material described in the present invention is an insulating material in which a plastic resin is foamed with a foaming agent, and has poor thermal insulation properties compared to expanded rubber (Foam Rubber), but it is possible to maintain its shape as a single body, so it is useful as a building material requiring weather resistance. Representative examples include extruded expanded polystyrene, rigid urethane foam, polyethylene foam, expanded PVC, and expanded polyurethane, and the thermal conductivity may be in the range of approximately 0.020 to 0.1 kcal/mh° C. at an average temperature of 20° C.

Figure 7A:
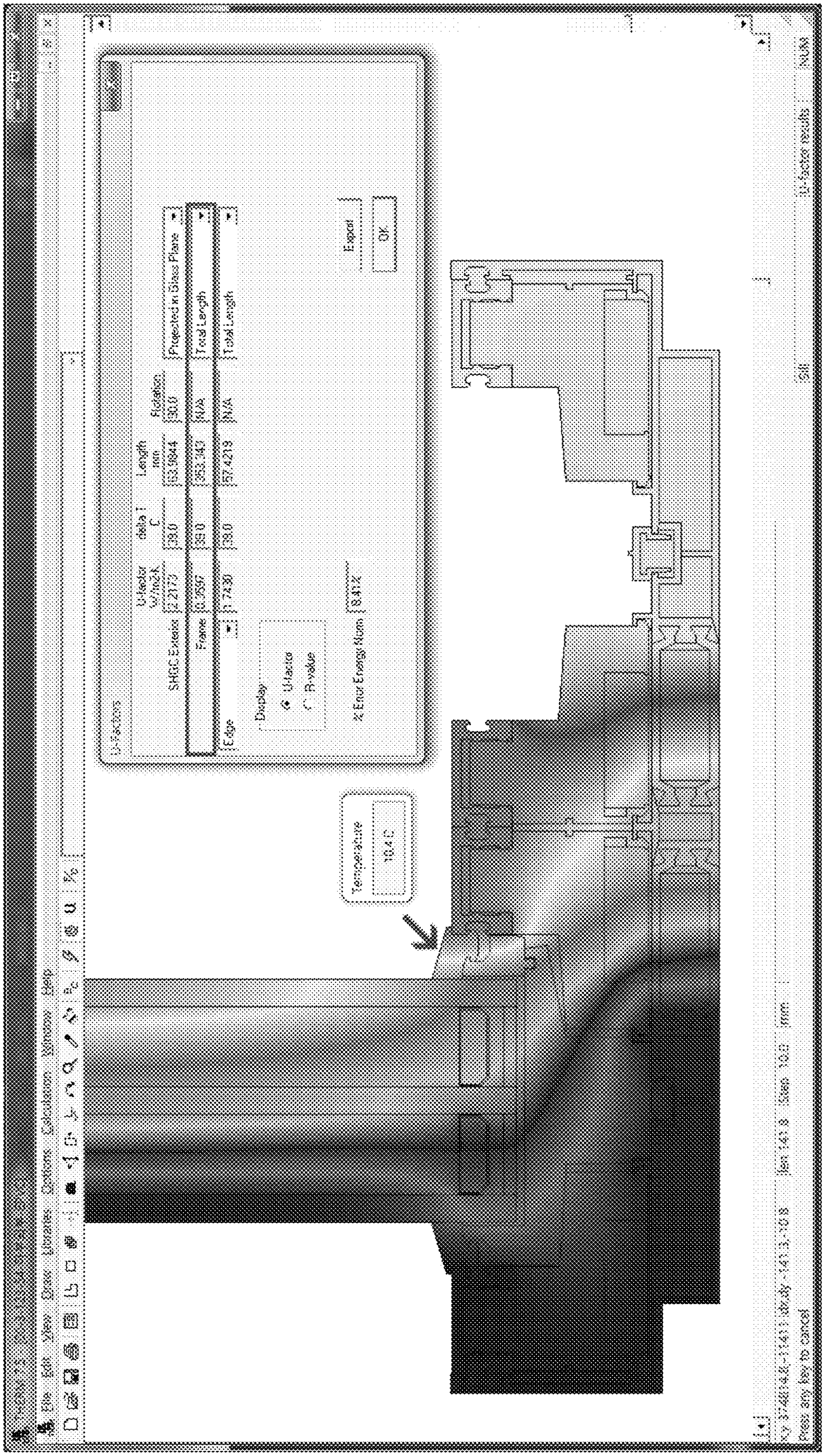
FIG. 7*a* is a numerical analysis test result of an embodiment of the installation structure of a glass fixing gasket and a window glass panel fixing bracket of a fixed window constituting a sliding window system including a segment type window frame according to the present invention.
Figure 7B:
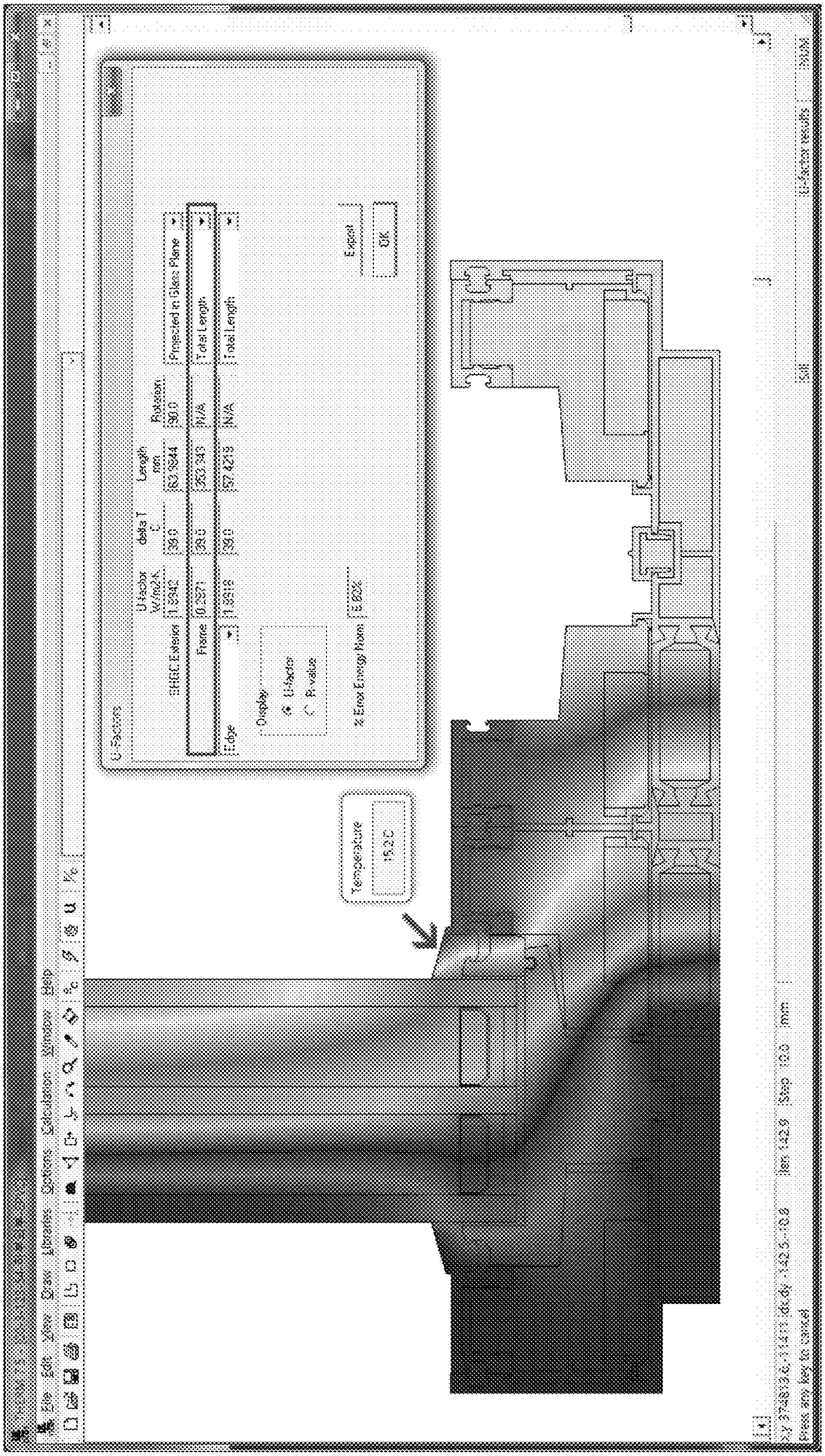
FIG. 7*b* shows the numerical analysis test result about Comparative Example 2, wherein a glass fixing gasket is made of EPDM synthetic rubber material changed from the foam rubber material in the installation structure of the glass fixing gasket of the fixed window and the window glass panel fixing bracket constituting the sliding window system including the segment-type window frame according to the present invention.

Numerical analysis test result obtained by simulating the temperature of the window system component by configuring the configuration according to the preferred embodiment of the present invention as a numerical analysis model (outdoor temperature −18° C., room temperature 21° C.: temperature difference ΔT=39° C.) is shown in FIG. 7*a* of the accompanying drawings. According to the analysis results, the effect of maintaining a high temperature of 15.2° C. at the reference point of the inner part 110 of the window frame 100, thus indicating high energy efficiency and further preventing condensation was confirmed. And in Comparative Example 2 of a different configuration (the shape and arrangement of the components are the same, but the comparative state using EPDM (Ethylene Propylene Diene Monomer) instead of foam rubber), as shown in the accompanying drawings FIG. 7*b*, relatively low temperature of 10.4° C. is maintained at the reference point of the inner part 110 of the window frame 100. Compared with the preferred embodiment of the present invention, it can be seen that a temperature drop of 4.8° C. appears.

As described above, in the drawings showing the preferred embodiments of the present invention for the sliding window to which the present invention is applied, a plurality of glass panels are formed by overlapping at a predetermined interval, but by bonding with a sealing member to realize a vacuum in the gap. Although it has been described by exemplifying that it is applied to a window with a pair of glass to be formed, the scope of the present invention is not limited thereto, and includes cases applied to various types of sliding windows (doors or windows). Various modifications and improvements of those skilled in the art using the basic concept of the present invention defined in the following claims also belong to the scope of the present invention.

The invention claimed is:

1. An installation structure for fixing a window glass panel of a fixed window, the fixed window constituting a sliding window system and including a segment type window frame, the installation structure comprising:

an outer segment insulating support (1320*a*) inserted into a first window frame portion (1110), the first window frame portion for an outer portion of the window glass panel (100) and for a central portion of the window glass panel;

an inner segment insulating support (1320*b*) inserted into a second window frame portion (1310, 1500), the second window frame portion for an inner portion of the window glass panel;

an insulating glass pedestal (1330) (1330-*u*, 1330-*d*, 1330-*s*) made of an expanded plastic-based material that is inserted and installed in a space between the outer segment insulating support (1320*a*) and the inner segment insulating support (1320*b*);

an outer glass fixing gasket (1120*ge*) made of an expanded rubber material which is fitted to a first fitting groove (1330*a*) formed on an outer portion of the insulating glass pedestal (1330);

a window glass panel fixing bracket (1330*k*) made of an expanded plastic-based material having a fitting protrusion (1330*ka*) which is fitted to a second fitting groove (1330*b*) formed on an inner portion of the insulating glass pedestal (1330), wherein the window glass panel fixing bracket (1330*k*) is installed to respond to static pressure of wind pressure by supporting an inner side of the window glass panel (100); and an inner glass fixing gasket (1220*ge*) made of an expanded rubber material coupled to a fitting groove (1330*kb*) formed in the window glass panel fixing bracket (1330*k*); and the installation structure having an additional characteristic in that, an inner shape of the insulating glass pedestal (1330) has a reduced cross-section so as not to interfere with a central support surface (1320*b*-2) of the inner segment insulating support (1320*b*), when a rotational fitting end (1320*b*-1) of the inner segment insulating support (1320*b*) is rotated by a set angle and fitted to an inner locking protrusion (1111) of the first window frame portion (1110) for the outer portion and the central portion of the window glass panel; and wherein the installation structure is installed between the window frame portions (1110, 1310, 1500, 1120, 1220) and supports three sides of the window glass panel (100), wherein the three sides comprise an upper side, a lower side, and an outer one side of the window glass panel (100).

2. The installation structure according to the claim 1, characterized in that the outer segment insulating support (1320*a*) and the inner segment insulating support (1320*b*) are provided as a foamed plastic material.

3. The installation structure according to the claim 1, characterized in that the insulating glass pedestal (1330) is continuously contacting the window glass panel (100) on the upper side, the lower side, and the outer one side of the window glass panel (100).

4. The installation structure according to the claim 3, characterized in that a glass height adjustment pedestal (1330*s*) is interposed between the insulating glass pedestal (1330) and the window glass panel (100).

* * * * *